US00RE36966E

United States Patent [19]

Perkitny

[11] E Patent Number: Re. 36,966

[45] Reissued Date of Patent: Nov. 21, 2000

[54] COIN BANK

[76] Inventor: Jerzy Perkitny, 28115 Osborn, Bay Village, Ohio 44140

[21] Appl. No.: 08/710,669

[22] Filed: Aug. 19, 1996

Related U.S. Patent Documents

Reissue of:

[64] Patent No.: 5,474,496
Issued: Dec. 12, 1995
Appl. No.: 08/144,709
Filed: Oct. 28, 1993

U.S. Applications:

[63] Continuation-in-part of application No. 29/000,721, Oct. 30, 1992, Pat. No. Des. 347,929.

[51] Int. Cl.[7] ..... G07D 3/08

[52] U.S. Cl. ..... 453/9; 453/57; 446/10

[58] Field of Search ..... 453/9, 10, 12, 453/13, 15, 16, 17, 39, 40, 49, 57; 446/8, 10

[56] References Cited

U.S. PATENT DOCUMENTS

| | | | |
|---|---|---|---|
| D. 296,029 | 5/1988 | Knox . | |
| 812,327 | 2/1906 | Cranner | 453/9 |
| 1,066,076 | 7/1913 | Campbell et al. | 453/15 |
| 1,433,943 | 10/1922 | Doldt | 453/57 |
| 1,965,926 | 7/1934 | Lewis | 453/9 |
| 2,423,502 | 7/1947 | Jorgensen | 453/9 X |
| 3,086,536 | 4/1963 | Klopp | 453/9 |
| 3,161,351 | 12/1964 | Lerner . | |
| 3,242,931 | 3/1966 | Wandry . | |
| 3,338,250 | 8/1967 | Mehelich | 453/9 |
| 3,410,385 | 11/1968 | Freet et al. . | |
| 3,698,537 | 10/1972 | Black et al. | 453/57 |
| 4,167,949 | 9/1979 | Hashimoto et al. | 453/57 X |
| 4,304,247 | 12/1981 | Hasegawa | 453/10 |
| 4,396,029 | 8/1983 | Anderson | 453/15 |
| 4,541,444 | 9/1985 | Okada | 453/17 |
| 4,987,990 | 1/1991 | Perkitny . | |
| 4,995,848 | 2/1991 | Goh | 453/9 X |
| 4,997,406 | 3/1991 | Horiguchi et al. | 453/57 |
| 5,122,093 | 6/1992 | Perkitny . | |
| 5,232,399 | 8/1993 | LeHong et al. | 453/57 |

FOREIGN PATENT DOCUMENTS

| | | | |
|---|---|---|---|
| 671602 | 11/1965 | Belgium | 453/9 |
| 0021567 | 1/1981 | European Pat. Off. | 453/13 |
| 6615183 | 5/1967 | Netherlands | 453/9 |
| 412052 | 6/1934 | United Kingdom | 453/13 |
| 706981 | 4/1954 | United Kingdom | 453/12 |
| 914652 | 1/1963 | United Kingdom | 453/12 |
| 2130779 | 6/1984 | United Kingdom | 453/9 |

OTHER PUBLICATIONS

MagNif Inc. (Mentor, Ohio), MagNif Banks, Puzzles, Games, Gifts (Catalog for Retailers) (1994).

*Primary Examiner*—F. J. Bartuska
*Attorney, Agent, or Firm*—Fay, Sharpe, Fagan, Minnich & McKee, LLP

[57] ABSTRACT

A coin bank which sorts coins and deposits them in containers is disclosed. A coin or a group of coins is dropped into a coin receiver. Each coin is removed one at a time from the coin receiver and dropped into a helical coin path by a motorized separator mechanism. The coins roll on edge along the coin path where they encounter apertures of varying sizes. When a coin encounters an aperture larger than its diameter, it falls out of the path to a container. A mechanical coin sensor mechanism is provided to start the separator when a coin is sensed in the coin receiver. The sensor mechanism also delays the shut-off of the motor when coins are no longer sensed in the coin receiver. The housing and most parts of the bank are transparent to permit viewing of the sensor mechanism and the coin path.

36 Claims, 7 Drawing Sheets

COIN BANK

Matter enclosed in heavy brackets [ ] appears in the original patent but forms no part of this reissue specification; matter printed in italics indicates the additions made by reissue.

*This application is a continuation-in-part of design patent application Ser. No. 29/000,721, filed on Oct. 30, 1992, which issued as U.S. Pat. No. Des. 347,929, on Jun. 14, 1994.*

BACKGROUND OF THE INVENTION

1. Field of the Invention

This invention relates to coin banks, and more particularly, to motorized coin banks having coin sorters.

2. Description of the Related Art

Motorized coin banks which son coins are sold as toys or novelties. Often, these banks flip or roll the coins as they are sorted. In some cases, levers and wheels are made to pivot or spin to create interesting visual effects.

In one motorized coin bank disclosed in U.S. Pat. No. 4,987,990, coins are made to roll on edge in a planar spiral path. Coins encounter openings of varying sizes along the path and fall out of the path at different locations to be sorted.

In another motorized bank disclosed in U.S. Pat. No. 5,122,093, coins are made to roll along rocking coin ramps where the coins encounter openings of varying sizes and fall out of the path at different locations to be sorted.

SUMMARY OF THE INVENTION

Basically, the invention is a coin bank for sorting and storing coins of varying diameters. The coin bank includes: a coin receiver for receiving unsorted coins; a plurality of coin storage containers for storing sorted coins; a helical coin path located between the coin storage containers and the coin receiver; a separator for removing individual coins one at a time from the receiver and depositing each coin in the path such that each coin rolls edgewise along the path; a plurality of apertures of varying size, each being sized to permit passage of only coins having a diameter less than or equal to a predetermined distance. The apertures are located along the path such that each aperture is spaced from the other apertures and are arranged in increasing order of size such that the smallest aperture is located at an upstream portion of the path and the largest aperture is located at a downstream portion of the path. A coin storage container is located adjacent each aperture to catch coins of a particular size which pass through the apertures.

The preferred and illustrated coin bank includes a coin sensor in the coin receiver for sensing the presence of a coin and for controlling the separator.

In the preferred and illustrated embodiment, the coin path has a cylindrical outer wall for guiding coins in the path such that a portion of a face of each coin rolling along the path contacts the outer wall and the apertures arc formed in the outer wall.

The separator is preferably powered by an electric motor and the coin sensor forms part of a switching mechanism which controls the power supply to the separator.

In the preferred and illustrated coin bank, the switching mechanism operates to turn off power to the separator after a predetermined time has elapsed from a time when the absence of a coin is sensed.

The preferred switching mechanism includes a timing mechanism for delaying the turning off of the separator after the absence of coins in the receiver is sensed.

The preferred and illustrated coin bank includes a cam and follower mechanism connected to the containers for moving the containers outwardly of the bank to facilitate their removal.

BRIEF DESCRIPTION OF THE DRAWINGS

A preferred embodiment of the invention is shown in the accompanying drawings in which.

DESCRIPTION OF THE PREFERRED EMBODIMENT

Figure 1:
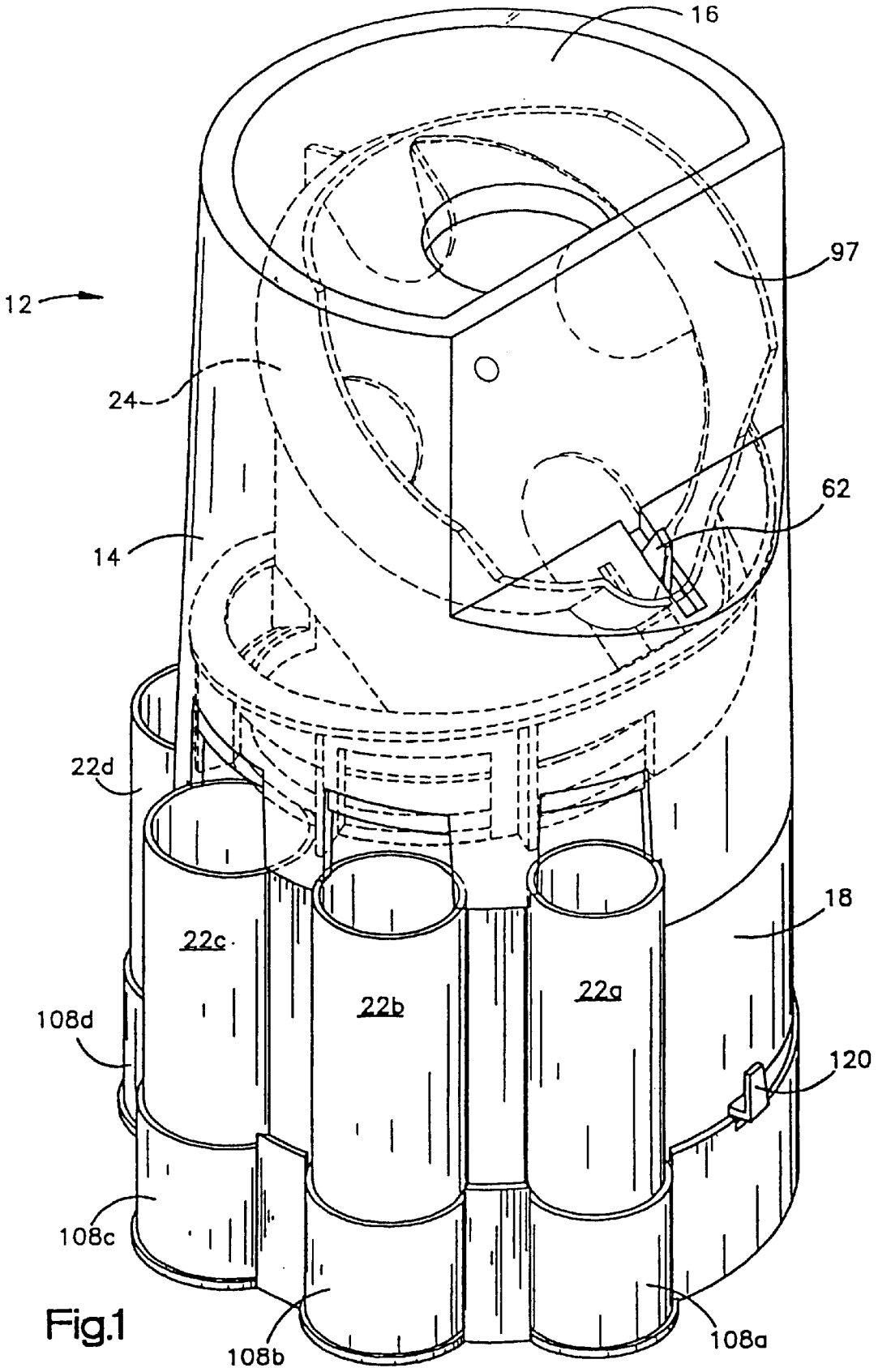
FIG. 1 is a perspective view of coin bank according to the invention.
Figure 2:
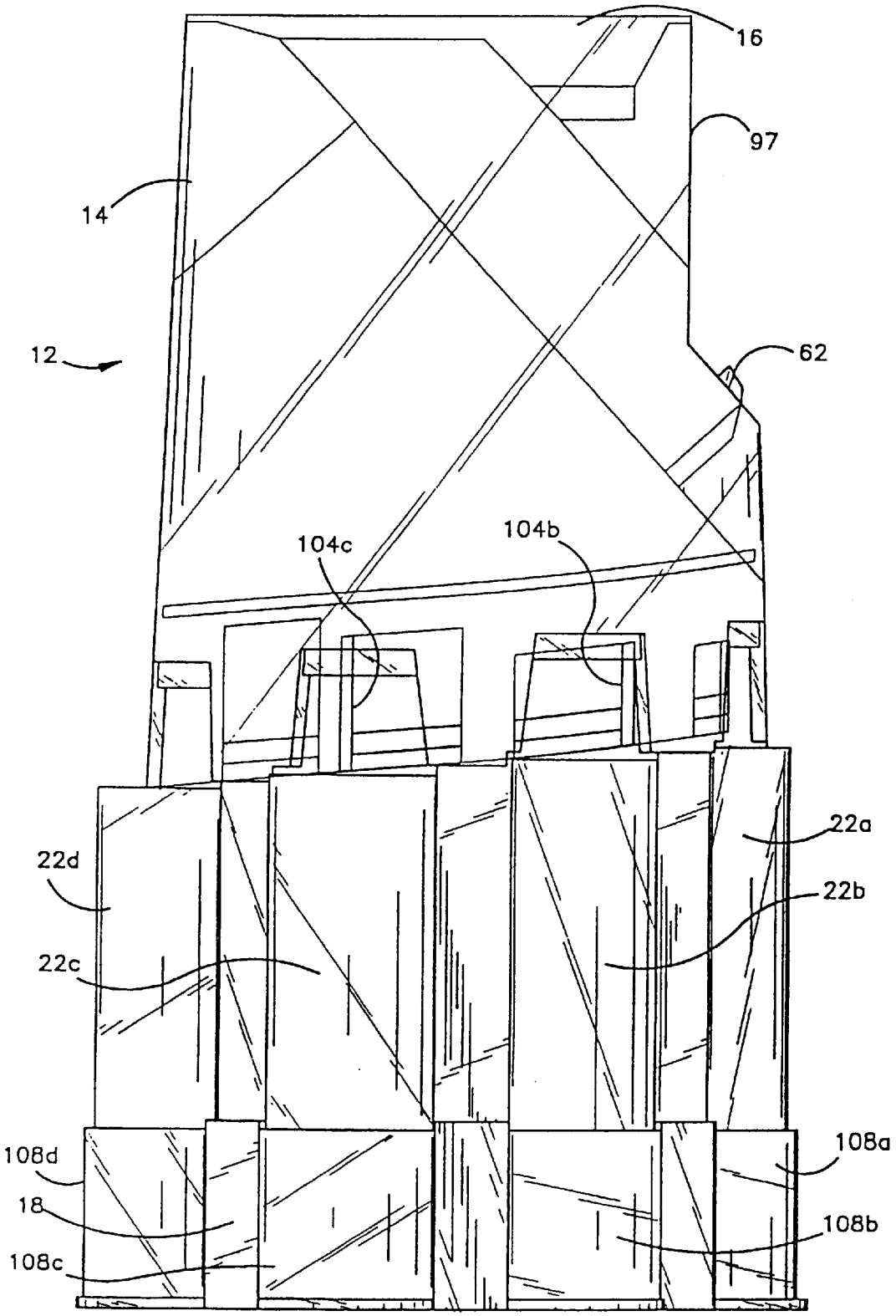
FIG. 2 is a side elevational view of the coin bank of FIG. 1.

A coin bank 12 embodying the present invention is illustrated in FIGS. 1 and 2. The coin bank 12 includes an upper housing 14, a coin funnel 16, a lower housing 18, a plurality of coin containers 22A, 22B, 22C, 22D, a separator assembly 24, and a coin ramp 26. The upper housing 14 covers the separator mechanism 24 and the coin ramp 26. The upper housing 14 attaches to the lower housing 18 which supports the coin containers 22A–22D. When a handful of coins arc dropped into the coin funnel 16, they fall into the separator assembly 24 and arc individually conveyed to the coin ramp 26. From the coin ramp 26, each coin falls into a coin container 22A–22D corresponding to its size. Most of the parts including the upper and lower housings arc preferably constructed of transparent plastic which permits the separator assembly 24, the coin ramp 26, and the moving coins to be viewed which presents interesting visual effects.

Referring to FIGS. 3 and 4A–4F, the coin separator assembly 24 includes a housing 28, a coin receiver 32, a separator wheel 34, a coin opening 36, a motor 38, a motor control switch 42, a ratchet arm 44, a coin sensor arm 46, a lifter arm 48, a pinion 52, a gear 54, and a lock arm 56. The separator assembly 24 serves to separate individual coins from a group of coins in the receiver 32 and drop each on the coin ramp 26. Additionally, the separator assembly 24 includes a timing mechanism for causing the motor 38 to run for a predetermined time period even when the last coin in the receiver 32 is lifted from the coin sensor arm 46 thus assuring that the last coin is deposited onto the coin ramp 26 before the motor 38 stops. A battery compartment (not shown) is provided in the lower housing 18 for powering the motor 38.

Figure 4B:
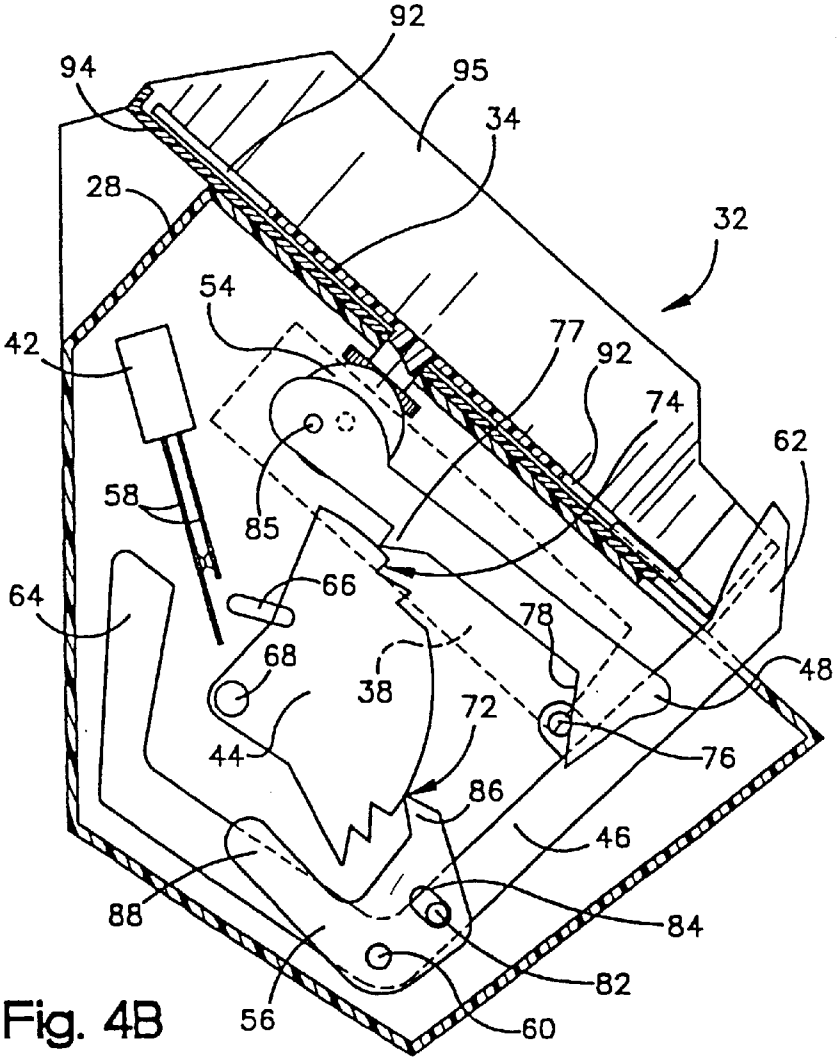
FIGS. 4A–4F are side views of the separator and coin sensor mechanism with portions removed, each view showing the mechanism at a different stage.
Figure 4A:
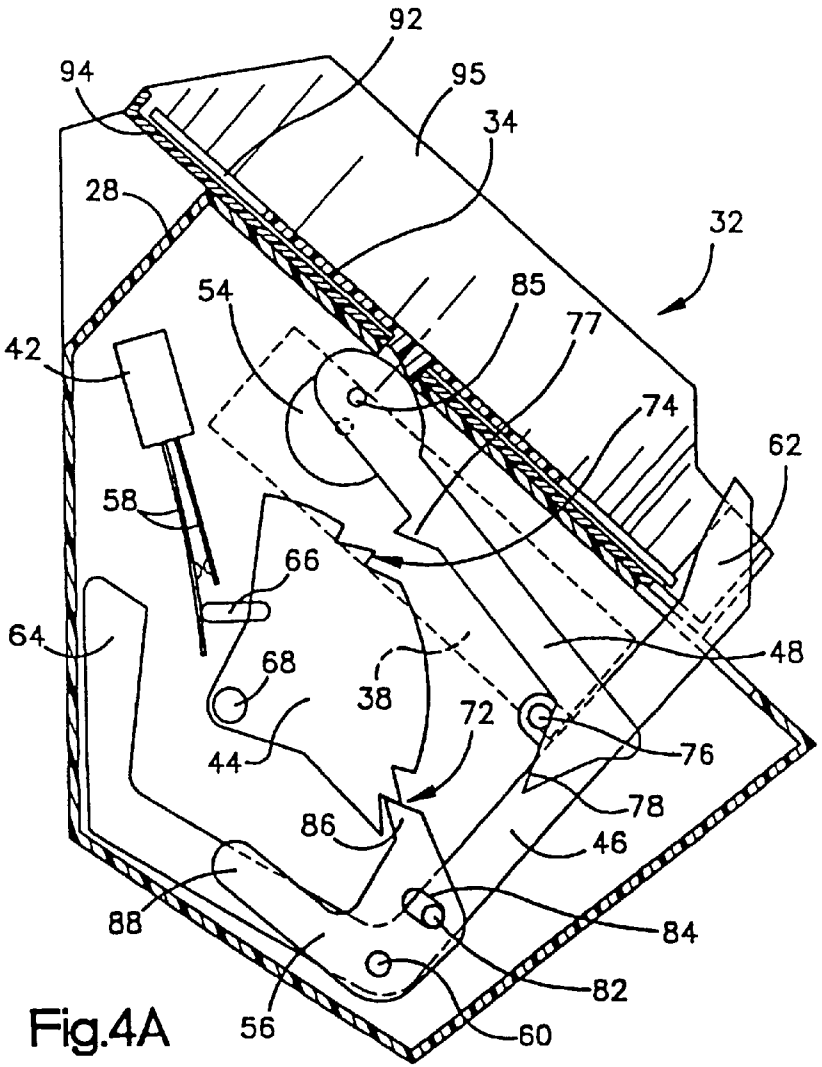
Figure 4D:
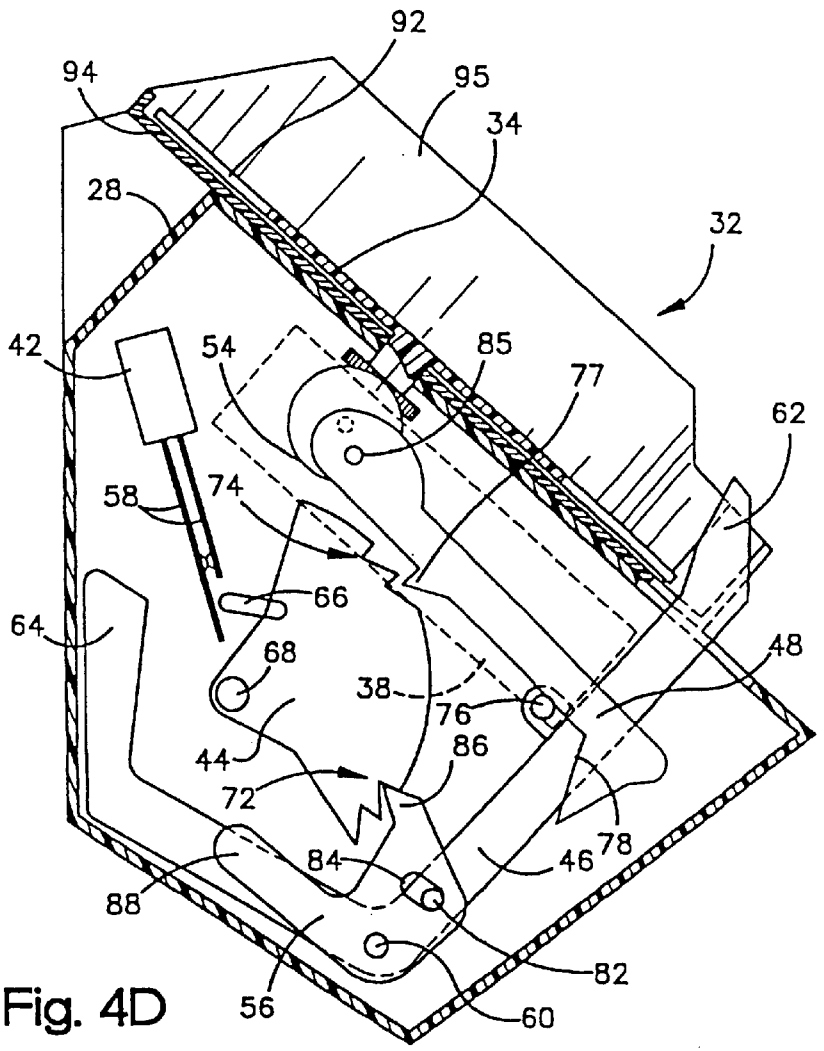

FIG. 4A shows the rest position of the coin separator 24. No coins are in the receiver 32. The sensor arm 46 is free to pivot about a pin 60 and has an actuator end 62 and a weighted end 64. The actuator end 62 occupies the lowermost space of the coin receiver 32 when the bank 12 is in its rest position. The gravitational pull on the weighted end 64 is greater causing the arm 46 to pivot counterclockwise when no coins are contacting the actuator end 62 as viewed in FIG. 4A. In the rest position, a pair of flexible contact 58 of the motor control switch 42 are held open by a switch actuator finger 66 which extends from the ratchet arm 44. Power to the motor 38 is shut off when the switch 42 is open. The ratchet arm 44 is pivotable about a pin 68. As seen in FIG. 4A, the ratchet arm 44 is held in its counter clockwise position by the lock arm 56 which engages a set of ratchet teeth 72.

When a coin or a group of coins is dropped into the receiver 32, the actuator end 62 is pushed down and the arm 46 is pivoted clockwise to the position shown in FIG. 4B. The clockwise movement of the sensor arm 46 causes the ratchet arm 44 to pivot clockwise about pin 68 which allows the switch contacts 58 to return to their closed position which starts the motor 38. A pin 85 pivotally connects the lifter arm 48 to an off-center portion of the gear 54. An outer pin 76 fixed to the sensor arm 46 pushes against a sloped surface 78 of the lifter arm 48 when the sensor arm 46 pivots clockwise causing the lifter arm 48 to pivot in a counterclockwise direction about the pin 85. The pin 76 thus keeps a tooth 77 fixed to the lifter arm 48 away from a set of lifter teeth 74. The lock arm 56 has a toothed end 86 and a weighted end 88. The lock arm 56 is pivotable about the pin 60. The weighted end 88 is heavier causing the lock arm 56 to be biased in the counterclockwise direction against the ratchet teeth 72. When the sensor arm 46 moves clockwise in response to the weight of a coin, an inner pin 82, which extends from the side of the sensor arm 46 and through an opening 84 in the lock arm 56, engages the lock arm 56 causing it to pivot in a clockwise direction about the pin 60. This action disengages the toothed end 86 from the ratchet teeth 72. Without the resistance of the lock arm 56 or the lifter arm 48, the ratchet arm 44 rotates clockwise about the pin 68 under the force of gravity to close the switch 42. As long as at least one coin is in the lower part of the coin receiver 32, the sensor arm 46 will be kept in the position shown in FIG. 4A and the switch 42 will remain closed.

Figure 3:
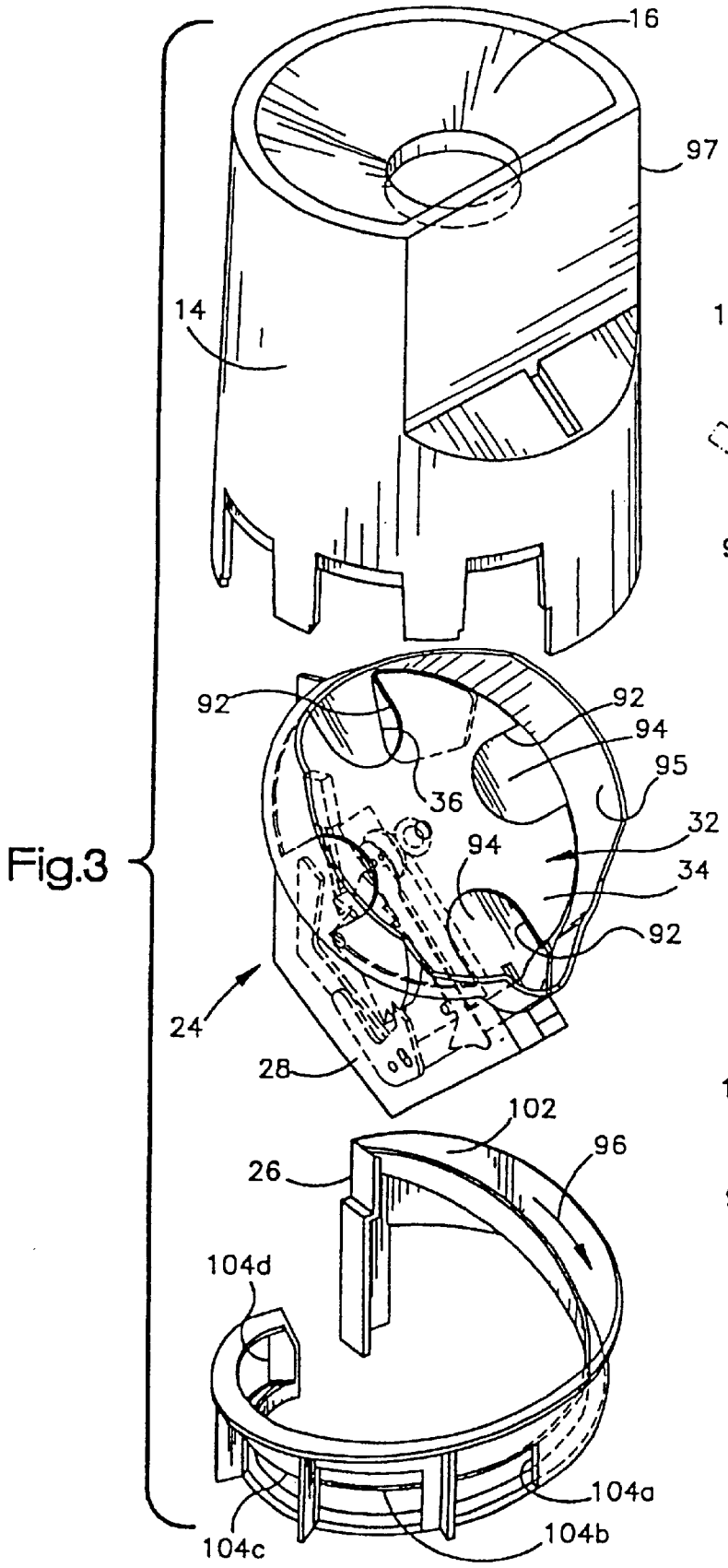
FIG. 3 is an exploded perspective view of the upper housing, the coin separator and the coin ramp of the coin bank.

The motor 38 drives the separator wheel 34 in a counterclockwise direction as viewed in FIG. 3. The wheel 34 is preferably a disk having four U-shaped notches 92 formed in its periphery. Each notch 92 is sized to be larger in width than the largest coin which is to be sorted by the bank 12. The coin receiver 32 has a planar base 94 which is fixed to the upper housing 14 at a slope of approximately 45 degrees from horizontal. Coins tend to come to rest in the lowermost portion of the receiver 32 with their faces contacting the wheel 34 or the base 94. A wall 95 is formed about the periphery of the planar base 94 to contain coins. An upper wall 97 of the housing also serves to contain coins dropped into the receiver 32. When the wheel 34 is rotated, it will engage a coin with the edge of one of its notches 92 and carry it upwards to the opening 36 formed in the base 94 where the coin will fall into the upper portion of the coin ramp 26. When a coin is engaged by the wheel 34, its face contacts the base 94 while its edge is contacted by the wheel 34. Each notch 92 receives a single coin and transports it to the opening 36 until all of the coins are gone. The thickness of the wheel 34 is chosen to be less than or equal to the thickness of the thinnest coin to be sorted so that only one coin at a time is engaged by each notch 92. *The separator wheel 34 has a thickness dimension approximately equal to a thickness of the planar base 94, as is evident from FIG. 4A. The separator wheel removes individual ones of the coins, one at a time, from the receiver 32 and deposits each one in the opening 36.* The opening 36 is large enough so that any coin has time to fall clear of the wheel 34 even when the wheel 34 is rotating at relatively high speed.

The steepness of the slope of the base 94 was chosen to ensure that the frictional forces between stacked coins are not great enough to cause more than one coin to be carried toward the opening 36 by a given notch 92. That is, if the base 94 and the separator wheel 34 were positioned at an angle closer to horizontal, coins stacked on top of the coin engaged by the notch might be carried to the opening 36 which might cause a coin jam.

Figure 4C:
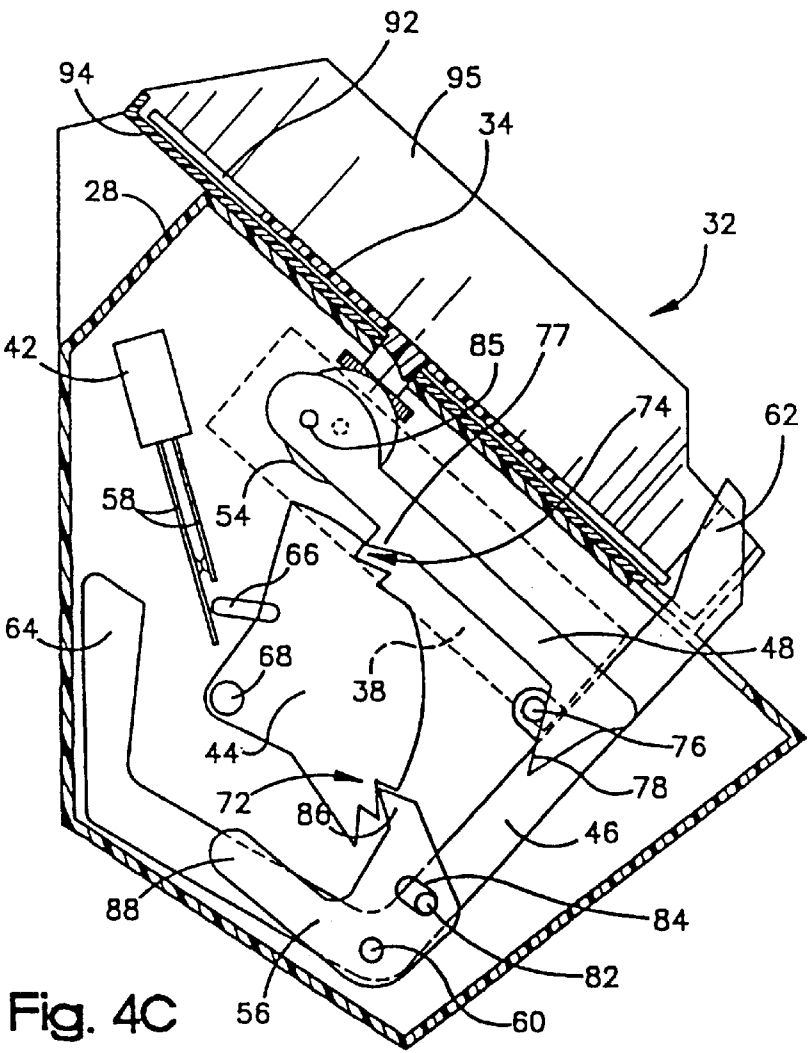
Figure 4F:
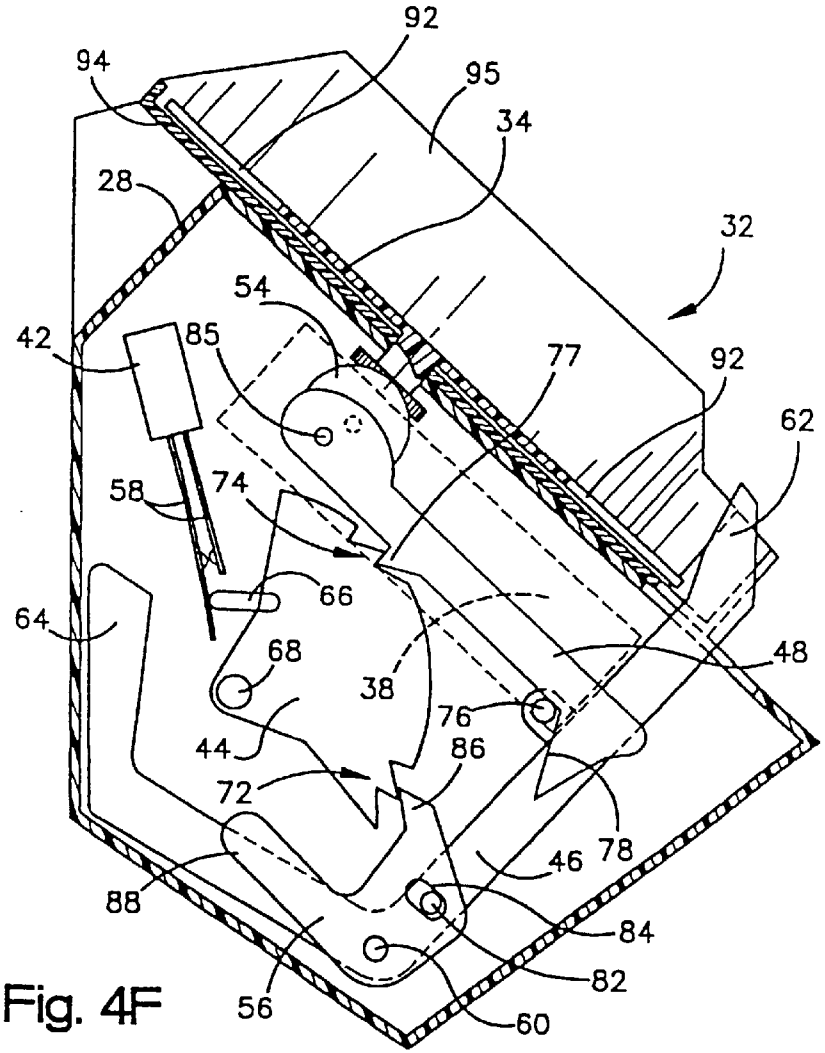
Figure 4E:
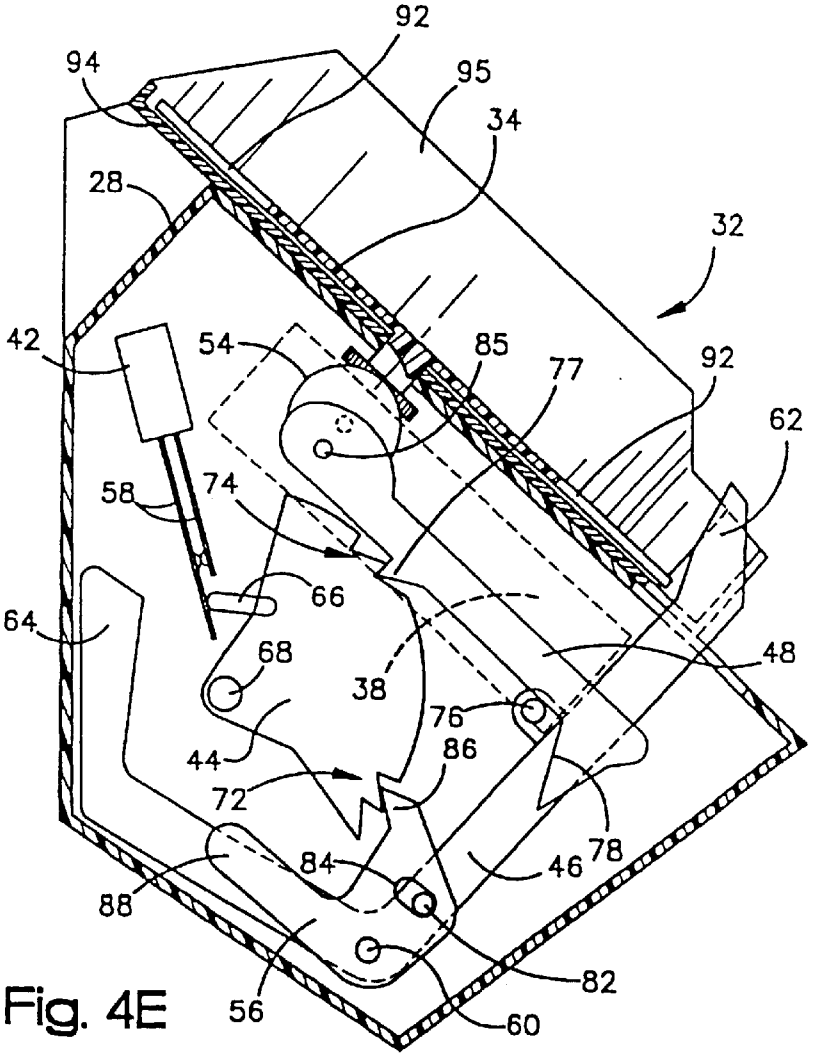

When no more coins remain in the receiver 32, the sensor arm 46 is free to return to its counterclockwise position as shown in FIG. 4C. While the motor 38 is running, the lifter arm 48 is oscillated due to its off-center connection to the rotating gear 54 which is driven by the pinion 52. When the sensor arm 46 is in its clockwise position (FIG. 4B) the pin 76 engages the sloped surface 78 and prevents the moving tooth 77 on the lifter arm 48 from contacting the lifter teeth 74. That is, the pin 76 moves the lifter arm 48 counterclockwise about the pin 85 and keeps the tooth 77 away from the lifter teeth 74 as long as a coin remains in the receiver 32. When there are no coins in the receiver 32, the pin 76 moves to a different position of engagement with the sloped surface 78 and causes the lifter arm 48 to pivot clockwise under the force of gravity which permits the tooth 77 to engage the lifter teeth 74. With the first oscillation of the lifter arm 48 after the sensor arm 46 moves counterclockwise, the tooth 77 engages the uppermost one of the lifter teeth 74 and pivots the ratchet arm 44 counterclockwise about the pin 68. This causes the toothed end 86 of the lock arm 56 to engage the uppermost tooth of the ratchet teeth 72. With the lock arm 56 engaged with the ratchet teeth 72, the ratchet arm 44 cannot pivot clockwise even when the lifter arm 48 disengages. The oscillation of the lifter arm 48 will cause it to disengage the uppermost lifter tooth and move to engage the second lifter tooth, and in the process, rotate the ratchet arm 44 further in the counterclockwise direction. See FIGS. 4D–4F. When the ratchet arm 44 is again rotated counterclockwise, the lock arm 56 engages the second ratchet tooth and the switch arms 58 are eventually opened by the finger 66 to shut off the motor 38. See FIG. 4F and 4A. Even after the switch 42 is opened, momentum will rotate the motor 38 for a short time. The time delay caused by the movement of the ratchet arm 44 permits the last coin to be transported to the coin opening 36 before the separator wheel 34 stops moving. The length of the delay is dependent upon the gear ratio between the pinion 52 and the gear 54 and other factors. However, the delay must be at least long enough for a coin to be carried from the lowermost part of the receiver 32 to the opening 36 which is approximately one half revolution of the separator wheel 34. In the preferred embodiment, the delay is set to be approximately one revolution of the separator wheel 34.

Figure 5A:
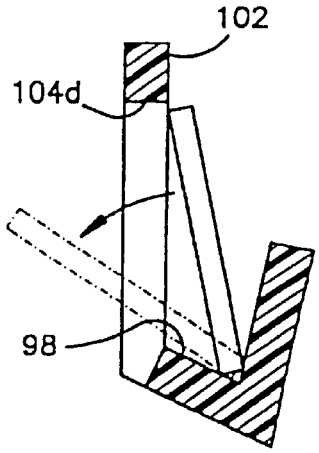
FIGS. 5A and 5B are cross sectional views of the coin path.

Once a coin falls through the opening 36, it lands on edge in the upper portion of the coin ramp 26. Under the influence of gravity, each coin then rolls along a helical coin path 96 toward the coin containers 22A–22D. Referring to FIG. 5A, a floor 98 of the coin ramp is sloped to cause the bottom of each coin to roll along the inside of the ramp 26. Centrifugal force and the sloped floor 98 cause the top of each coin to contact the outer wall 102 of the ramp 26 as each coin rolls down the path 96. A plurality of apertures 104A, 104B, 104C, 104D of varying sizes are formed in the outer wall 102 at spaced locations along the path 96. Each aperture 104A–D corresponds to a particular coin size. The apertures

Figure 5B:
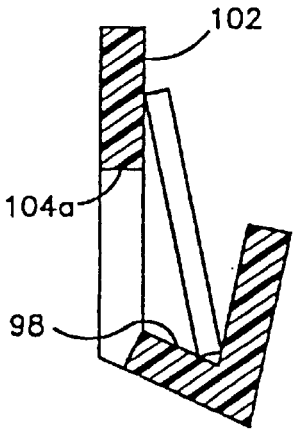

104A–D are arranged in order of increasing size such that the smallest aperture 104A is located upstream of all the others and the largest aperture 104D is located downstream of all the others. When a coin encounters an aperture 104A smaller in height than its diameter as illustrated in FIG. 5B, it simply passes by. When a coin encounters an aperture 104D larger in height than its diameter as illustrated in FIG. 5A, it falls through the aperture 104D and into a coin container 22D. Thus the coins are sorted according to their size.

Figure 6:
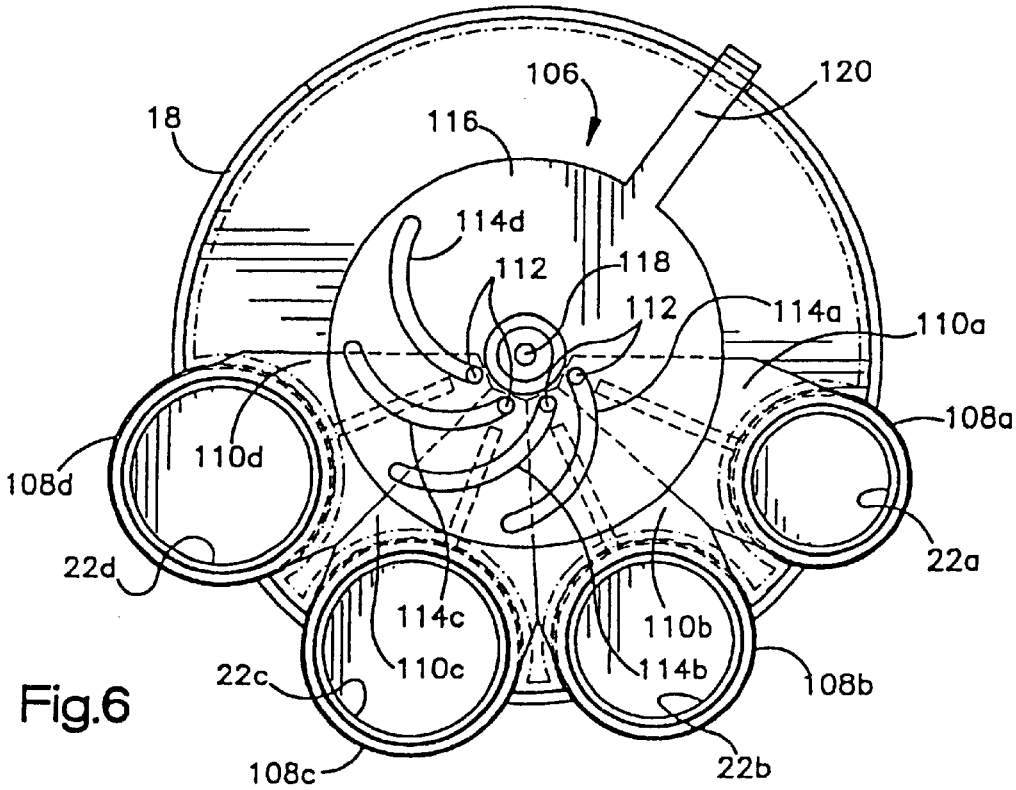
FIG. 6 is a top plan view of a cam and follower mechanism and the coin receivers with the upper part of the housing removed, the coin receivers being shifted fully inward.
Figure 7:
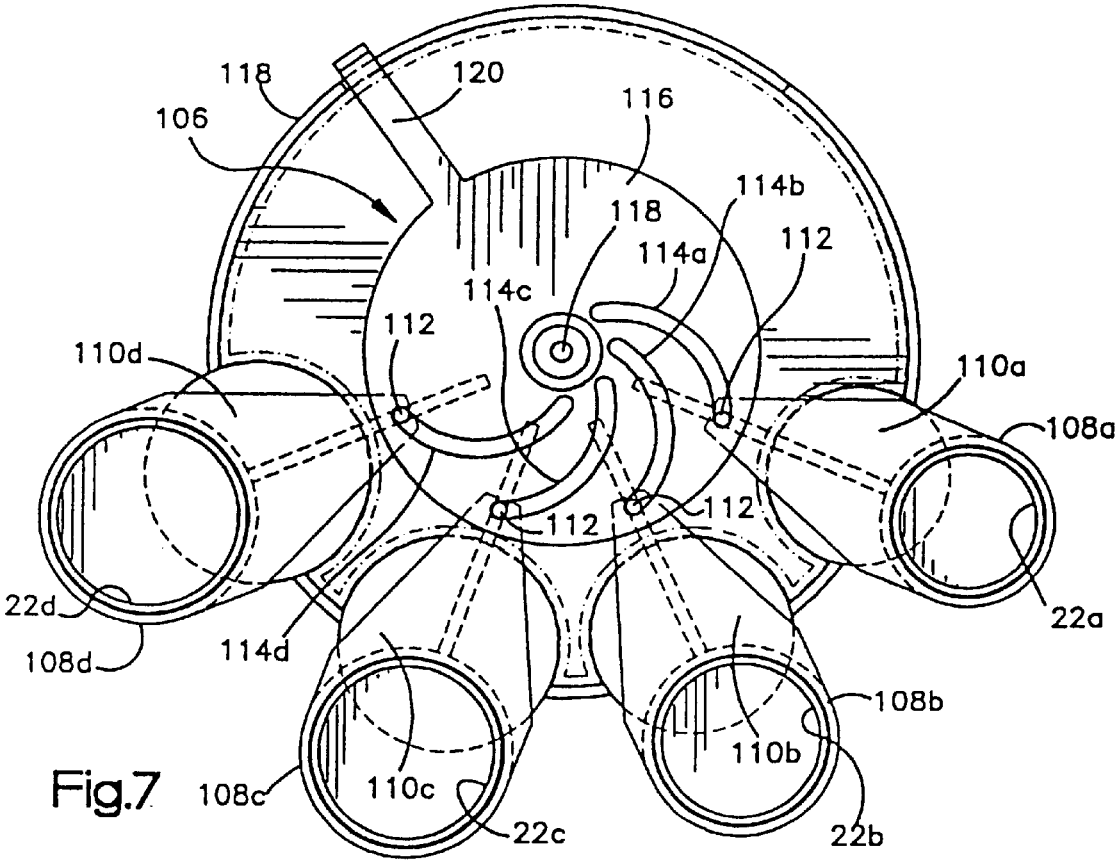
FIG. 7 is a top plan view like FIG. 5 with the cam and follower mechanism at a fully shifted outward position.

Referring to FIGS. 6 and 7, a cam and follower mechanism 106 is provided to shift the positions of the coin containers 22A–D outward to facilitate their removal. The lower housing 18 supports a plurality of receptacles 108A, 108B, 108C, 108D, each having an extension 110A–110D and a follower pin 112. Each receptacle 108A–D is slidable between an inner position shown in FIG. 6 and an outer position shown in FIG. 7. A coin container 22A–D is held by each receptacle 108A–D and is removable by lifting the container upward. Each follower pin 112 is fitted inside a corresponding curved slot 114A–114D formed in a rotatable cam 116. The cam 116 is rotatable about a fixed center axis 118 when a lever 120 is moved. When the lever 120 is moved to rotate the cam 116 clockwise as viewed in FIG. 6, the receptacles 108 are moved inward by the force of the cam 116 on the follower pins 112. When the cam 116 is moved counterclockwise as viewed in FIG. 7, the receptacles 108A–108D are moved outward. The containers 22A–22D are properly aligned with the apertures 104A–104D when in their inner positions of FIG. 6. In this position, the upper housing 14 prevents the removal of the containers 22A–D from the receptacles. In the outer position, the containers 22A–D are free from interference with the upper housing 14 and may be lifted and removed from the receptacles 108A–D. The cam 116 may be connected to a spring which urges the cam 116 clockwise to hold the receptacles 108A–D in the inner position (not shown).

While a preferred embodiment of this invention has been described in detail, it will be apparent that certain modifications or alterations can be made without departing from the spirit and scope of the invention set forth in the appended claims.

I claim:

1. A coin bank for sorting and storing coins of varying sizes, said bank comprising:

a coin receiver for receiving unsorted coins, said coin receiver having a sloping planar base, a lowermost portion to which the unsorted coins are directed and a separator member mounted in confronting relation to said planar base such that said separator member is movable in a plane which is parallel to said base, a coin sensor for detecting the presence of a coin in the lowermost portion of the coin receiver and wherein said sensor controls an electric motor for driving said separator member in response to the presence of a coin in the lowermost portion, said separator member having a thickness dimension in a direction perpendicular to said planar base, which *thickness dimension* is [less than or equal to the thinnest coin to be sorted and stored in said bank] *approximately equal to a thickness of said planar base*, said separator member operating to separate a coin from a group of coins and slide said coin along said planar base to an opening in said planar base where said coin passes through said base under the force of gravity.

2. A coin bank according to claim 1 wherein said sensor is connected to a delay mechanism for delaying a shut-off of power to said motor for a predetermined time.

3. A coin bank according to claim 1 wherein said separator member is a rotatable disk having at least one notch formed therein.

4. A coin bank according to claim 1 wherein said coin bank includes a helical coin path connected to said receiver to accept coins which pass through said opening in said [recever] *receiver* and in which helical coin path the coins roll substantially on their edges and fall to the outside of said helical path.

5. A coin bank according to claim 4 wherein said helical coin path decreases in radius in a direction from the coin receiver to a coin storage container.

6. A coin bank for sorting and storing coins of varying diameters, said coin bank comprising:

a coin receiver for receiving unsorted coins;

a plurality of coin storage containers for storing sorted coins;

a helical coin path located between said coin storage containers and said coin receiver;

a separator for removing individual ones of said coins one at a lime from said receiver and depositing each one in said path such that each coin rolls along said path;

a plurality of apertures of varying size, each being sized to permit passage of only coins having a diameter less than or equal to a predetermined distance, said apertures being located along said path such that each said aperture is spaced from the other apertures and are arranged in increasing order of size such that the smallest aperture is located at an upstream portion of said path and the largest aperture is located at a downstream portion of said path;

each coin rolling along said helical coin path substantially on its edge and falling to the outside of said helical coin path and through one of said apertures; and wherein a coin storage container is located adjacent each said aperture to catch coins of a particular size which pass through said apertures from said path.

7. A coin bank according to claim 6 wherein said coin path has a cylindrical outer wall for guiding coins in said path such that a portion of a face of each coin rolling along said path contacts said outer wall and wherein said apertures are formed in said outer wall.

[8. A coin bank according to claim 6 wherein said coin receiver includes a coin sensor for sensing the presence of a coin and for controlling said separator.]

[9. A coin bank according to claim 8 wherein said separator is powered by an electric motor and said coin sensor forms part of a switching mechanism which controls the power supply to said separator.]

[10. A coin bank according to claim 9 wherein said switching mechanism operates to turn off power to said separator after a predetermined time has elapsed from a time when the absence of a coin is sensed by said sensor.]

[11. A coin bank according to claim 10 wherein said switching mechanism includes a timing mechanism for delaying the turning off of said separator after the absence of coins in said receiver is sensed.]

[12. A coin bank for sorting and storing coins of varying diameters, said coin bank comprising:

a coin receiver for receiving unsorted coins;

a plurality of coin storage containers for storing sorted coins;

a coin path located between said coin storage containers and said coin receiver;

a plurality of apertures of varying size, each being sized to permit passage of only coins having a diameter less than or equal to a predetermined distance, said apertures being located along said path such that each said aperture is spaced from the other apertures and are arranged in order of size;

wherein a coin storage container is located adjacent each said aperture to catch coins of a particular size which pass through said apertures from said path;

a cam and follower mechanism connected to said containers for moving said containers outwardly of said bank to facilitate their removal.]

13. A coin bank for sorting and storing coins of varying sizes, said bank comprising:

a coin receiver for receiving unsorted coins, said receiver having a sloping planar base and a separator member mounted in confronting relation to said planar base such that said separator member is movable in a plane which is parallel to said base, said separator member having a thickness dimension in a direction perpendicular to said planar base, which *thickness dimension* is [less than or equal to the thinnest coin to be sorted and stored in said bank] *approximately equal to a thickness of said planar base*, said separator member operating to separate a coin from a group of coins and slide said coin along said planar base to an opening in said planar base where said coin passes through said base under the force of gravity, said coin receiver includes a coin sensor for detecting the presence of a coin in the lowermost portion of the coin receiver and wherein said sensor controls an electric motor for driving said separator member and said sensor is connected to a delay mechanism for delaying a shut-off of power to said motor for a predetermined time.

[14. A coin bank for sorting and storing coins of varying diameters, said coin bank comprising:

a coin receiver for receiving unsorted coins;

a plurality of coin storage containers for storing sorted coins;

a helical coin path located between said coin storage containers and said coin receiver;

a separator for removing individual ones of said coins one at a time from said receiver and depositing each one in a said path such that each coin rolls edgewise along said path;

a plurality of apertures of varying size, each being sized to permit passage of only coins having a diameter less than or equal to a predetermined distance, said apertures being located along said path such that each said aperture is spaced from the other apertures and are arranged in increasing order of size such that the smallest aperture is located at an upstream portion of said path and the largest aperture is located at a downstream portion of said path;

wherein a coin storage container is located adjacent each said aperture to catch coins of a particular size which pass through said apertures from said path; and wherein said coin path has a cylindrical outer wall for guiding coins in said path such that a portion of a face of each coin rolling along said path contacts said outer wall and wherein said apertures are formed in said outer wall.]

[15. A coin bank according to claim 14 further including a coin sensor in said coin receiver for sensing the presence of a coin, said separator is powered by an electric motor and said coin sensor forms part of a switching mechanism which controls the power supply to said separator, wherein said switching mechanism operates to turn off power to said separator after a predetermined time has elapsed from a time when the absence of a coin is sensed by said sensor.]

*16. A coin handler for sorting and storing coins, said handler comprising:*

*a housing having an upper portion, a middle portion, and a lower portion;*

*a funnel for receiving unsorted coins, said funnel located at the upper portion of said housing;*

*a coin receiver for receiving unsorted coins from said funnel, said coin receiver located below said funnel, said coin receiver having a generally circular separator member for separating the coins, said coin receiver located at the upper portion of said housing;*

*four coin storage containers for storing sorted coins, said four coin storage containers disposed on a common plane at the lower portion of said housing; and,*

*a coin path disposed within the housing, said coin path communicating said coin receiver with said four coin storage storage containers, said coin path having a width less than a height of said coin path, said coin path located at the middle portion of said housing.*

*17. A coin handler according to claim 16 wherein said coin receiver is adapted to receive a plurality of coins simultaneously.*

*18. A coin handler according to claim 16 wherein said coin receiver includes a sloped planar base on which is mounted the separator member.*

*19. A coin handler according to claim 18 wherein the separator member comprises a disk having at least one notch formed therein.*

*20. A coin handler according to claim 18 wherein said coin receiver includes a lever at a lower portion of the sloped planar base.*

*21. A coin handler according to claim 16 wherein said coin path is helical.*

*22. A coin handler according to claim 16 wherein a portion of each of said plurality of coin storage containers is located laterally outwardly of said coin path.*

*23. A coin handler according to claim 16 wherein the housing includes four apertures at the middle portion of said housing, each aperture located above one of said plurality of coin storage containers, each aperture passing coins of a uniform diameter therethrough.*

*24. A coin handler according to claim 16 wherein said four coin storage containers are cylindrical and have an inner diameter only slightly larger than a diameter of the coins being stored therein so that the coins are stacked in a column.*

*25. A coin bank for sorting and storing coins, said bank comprising:*

*a funnel for receiving unsorted coins, said funnel located at the upper portion of said housing;*

*a coin receiver for receiving unsorted coins from said funnel, said coin receiver located below said funnel, said coin receiver having a generally circular separator member for separating the coins, said coin receiver located at the upper portion of said housing;*

*four coin storage containers for storing sorted coins, said four coin storage containers disposed on a common plane at the lower portion of said housing; and,*

*a coin path disposed within the housing, said coin path communicating said coin receiver with said four coin storage containers, said coin path located at the middle portion of said housing, said coin path having a generally vertical surface and a generally horizontal*

*surface, the generally vertical surface having four spaced apertures, each aperture being located generally above a respective one of said four coin storage containers, each aperture passing coins of a uniform diameter therethrough.*

*26. A coin bank according to claim 25 wherein said coin receiver is adapted to receive a plurality of coins simultaneously.*

*27. A coin bank according to claim 25 wherein said coin receiver includes a sloped planar base on which is mounted the separator member.*

*28. A coin bank according to claim 27 wherein the separator member comprises a disk having at least one notch formed therein.*

*29. A coin bank according to claim 27 wherein said coin receiver includes an actuating arm at a lower portion of the sloped planar base.*

*30. A coin bank according to claim 25 wherein said coin path is helical.*

*31. A coin bank according to claim 25 wherein a portion of each of said four coin storage containers is located laterally outwardly of said coin path.*

*32. A coin bank according to claim 25 wherein said coin path has a width less than a height of said coin path.*

*33. A coin bank according to claim 25 wherein the housing includes four apertures at the middle portion of said housing, each aperture located above one of said four coin storage containers, each aperture passing coins of a uniform diameter therethrough.*

*34. A coin bank according to claim 25 wherein said four coin storage containers are cylindrical.*

*35. A coin bank for sorting and storing coins, said bank comprising:*

*a housing having an upper portion, a middle portion, and a lower portion;*

*a coin receiver for receiving unsorted coins, said coin receiver located at the upper portion of said housing;*

*four coin storage containers for storing sorted coins, each of said coin storage containers disposed on a common plane; and,*

*a helical coin path communicating said coin receiver with said four coin storage containers, said helical coin path located at the middle portion of said housing wherein a portion of each of said plurality of said four coin storage containers is located radially outwardly of said helical coin path.*

*36. A coin bank according to claim 35 wherein said coin receiver is adapted to receive a plurality of coins simultaneously.*

*37. A coin bank according to claim 35 further comprising a funnel, which feeds coins to the coin receiver, said funnel located at the upper portion of said housing.*

*38. A coin bank according to claim 35 wherein said coin receiver includes a sloped planar base and a separator member.*

*39. A coin bank according to claim 38 wherein the separator member comprises a disk having at least one notch formed therein.*

*40. A coin bank according to claim 38 wherein said coin receiver includes a lever at a lower portion of the sloped planar base.*

*41. A coin bank according to claim 35 wherein said coin path has a width less than a height of said coin path.*

*42. A coin bank according to claim 35 wherein the housing includes four apertures at the middle portion of said housing, each aperture located above a respective one of said four coin storage containers, each aperture passing coins of a uniform diameter therethrough.*

*43. A coin bank according to claim 35 wherein said four coin storage containers are cylindrical.*

* * * * *